United States Patent
Lim et al.

(10) Patent No.: US 8,923,840 B2
(45) Date of Patent: Dec. 30, 2014

(54) MOBILE TERMINAL HAVING MULTIMEDIA REPRODUCTION CONTROLS

(75) Inventors: Sang Yeon Lim, Gyeonggi-do (KR); Yeon Woo Park, Seoul (KR); Seung Eon Hong, Seoul (KR)

(73) Assignee: LG Electronics Inc., Seoul (KR)

(*) Notice: Subject to any disclaimer, the term of this patent is extended or adjusted under 35 U.S.C. 154(b) by 1443 days.

(21) Appl. No.: 11/740,277

(22) Filed: Apr. 25, 2007

(65) Prior Publication Data

US 2007/0249335 A1    Oct. 25, 2007

(30) Foreign Application Priority Data

Apr. 25, 2006    (KR) .................. 10-2006-0037179

(51) Int. Cl.
*H04W 28/02* (2009.01)
*H04M 1/22* (2006.01)
*H04M 1/02* (2006.01)
*H04M 1/725* (2006.01)

(52) U.S. Cl.
CPC ............ *H04M 1/22* (2013.01); *H04M 1/72558* (2013.01); *H04M 2250/18* (2013.01); *H04M 1/0235* (2013.01)
USPC .................. 455/422.1; 455/575.4; 455/566

(58) Field of Classification Search
CPC .............. H04M 1/0235; H04M 1/122; H04M 2250/18; H04M 1/00; H04Q 7/20; H04W 28/02
USPC ............... 455/90.3, 422.1, 575.1–575.4, 566; 345/174, 173; D14/138 AD
See application file for complete search history.

(56) References Cited

U.S. PATENT DOCUMENTS

| 6,249,672 | B1* | 6/2001 | Castiel ..................... 455/575.4 |
| 6,725,064 | B1 | 4/2004 | Wakamatsu et al. |
| 6,824,321 | B2* | 11/2004 | Ward et al. ................. 400/479 |
| 7,107,018 | B2* | 9/2006 | Jellicoe ..................... 455/90.3 |
| 7,493,151 | B2* | 2/2009 | Collins ..................... 455/575.4 |
| 7,610,069 | B2* | 10/2009 | Kwak et al. ................ 455/575.4 |
| 7,778,663 | B2* | 8/2010 | Bong Doo ................ 455/556.1 |
| 7,925,318 | B2* | 4/2011 | Im et al. .................... 455/575.4 |
| 2002/0196238 | A1* | 12/2002 | Tsukada et al. ............. 345/173 |
| 2004/0096053 | A1* | 5/2004 | Francke et al. ......... 379/428.04 |

(Continued)

FOREIGN PATENT DOCUMENTS

| EP | 1596562 | 11/2005 |
| EP | 1638299 | 3/2006 |

(Continued)

OTHER PUBLICATIONS

Oryl, M.; "LG KV5900 Chocolate Phone US Bound?"; XP002576035; Apr. 6, 2006; URL=http://www.mobileburn.com/news.jsp?Id=2282.

(Continued)

*Primary Examiner* — Khawar Iqbal
(74) *Attorney, Agent, or Firm* — Lee, Hong, Degerman, Kang & Waimey

(57) ABSTRACT

A slider-type mobile terminal has multimedia reproduction controls disposed along one edge of a fixed body that are exposed when the slider body is closed. Alternatively, the multimedia display disposed on the slider body, has a touch screen for displaying the multimedia reproduction controls. Terminal controls are disposed on the slider body, and are illuminated under control of the terminal controller, and are not illuminated when multimedia is being reproduced.

19 Claims, 4 Drawing Sheets

(a)

(b)

(56) References Cited

U.S. PATENT DOCUMENTS

| | | |
|---|---|---|
| 2005/0059438 A1 | 3/2005 | Jellicoe |
| 2005/0070344 A1 | 3/2005 | Im et al. |
| 2005/0070348 A1* | 3/2005 | Lee et al. .................. 455/575.4 |
| 2005/0130720 A1* | 6/2005 | Finke-Anlauff ........... 455/575.3 |
| 2006/0063571 A1 | 3/2006 | Chadha ...................... 455/575.3 |
| 2007/0247090 A1* | 10/2007 | Kim et al. ..................... 315/312 |
| 2007/0295588 A1* | 12/2007 | Kamata ......................... 200/341 |
| 2008/0030475 A1* | 2/2008 | Shin .............................. 345/169 |
| 2008/0070648 A1* | 3/2008 | Kang et al. ................ 455/575.3 |
| 2009/0117954 A1* | 5/2009 | Lee et al. .................. 455/575.3 |
| 2009/0131117 A1* | 5/2009 | Choi ............................ 455/566 |

FOREIGN PATENT DOCUMENTS

| | | |
|---|---|---|
| KR | 1020050007842 | 1/2005 |
| KR | 10-2006-0011452 A | 2/2006 |
| KR | 1020060017042 | 2/2006 |
| WO | 2005033883 | 4/2005 |
| WO | 2005039157 | 4/2005 |
| WO | 2006022313 | 3/2006 |

OTHER PUBLICATIONS

LG Electronics, Inc., "KG800 User Guide—English", Apr. 2006.

* cited by examiner (a)

(b)

(a)

(b)

(a)

(b)

MOBILE TERMINAL HAVING MULTIMEDIA REPRODUCTION CONTROLS

CROSS REFERENCE TO RELATED APPLICATION

This application claims the benefit of the Korean Patent Application No. 10-2006-0037179, filed on Apr. 25, 2006, which is hereby incorporated by reference as if fully set forth herein.

FIELD OF THE INVENTION

The present invention relates to a mobile terminal. Although the present invention is suitable for a wide scope of applications, it is particularly suitable for a mobile terminal that has the capability to reproduce broadcast and stored multimedia videos.

Remarkable developments of the information communication technologies have brought rapid transitions of information and communication environments. A mobile communication terminal is now regarded as a necessity of modern society.

In order to meet consumers' demand, various functions, specifically including a multimedia reproduction are provided as well as a general voice communications provided on the mobile communication terminal. Terminal users now regard the multimedia reproducing function as important as voice communication, even to the point of using the terminals more for multimedia reproduction than for voice communication. It is now necessary to design mobile communication terminals more suitable for multimedia reproduction.

SUMMARY OF THE INVENTION

Accordingly, the present invention is directed to a mobile terminal that substantially obviates one or more problems due to limitations and disadvantages of the related art.

An object of the present invention is to provide convenient operation of a mobile terminal capable of multimedia reproduction. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal capable of multimedia reproduction includes a first body, a second body connected to the first body, the second body having a display unit and an input unit, and a control unit configured to control terminal operations and multimedia reproduction, wherein the input unit is invisible to a user when multimedia is reproduced in the terminal.

In another aspect of the present invention, a mobile terminal capable of reproducing multimedia, includes a main body having a numeric keypad and at least one multimedia reproduction controls, the numeric keypad and the multimedia reproduction controls being located on the same face of the main body, a slider connected to the main body to enable the numeric keypad of the main body to be closed or opened via a sliding motion, a control unit for controlling terminal operations and multimedia reproduction, wherein when the numeric keypad is closed by the slider, a portion on the face of the main body is exposed revealing the multimedia reproduction controls.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings.

The present invention is applicable to various kinds of mobile terminals such as a personal digital assistant (PDA), a game player, and a mobile or portable phone. For convenience and simplicity of explanation in the following description, a slider-type mobile terminal will be described, yet, the present invention is not limited to a slide type mobile terminal only, and the present invention is not restricted by the following description.

Figure 1:
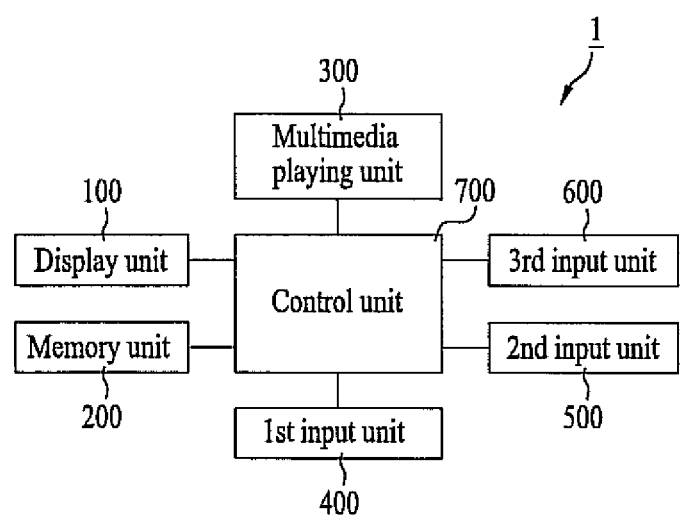
FIG. 1 is a block diagram of a mobile terminal according to the present invention.
Figure 2:
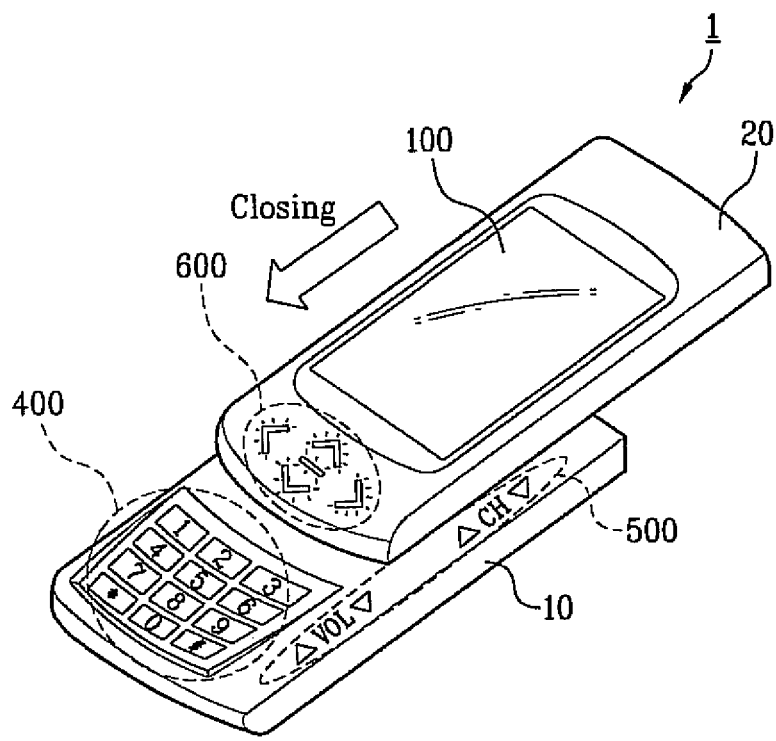
FIGS. 2a and 2b are perspective diagrams of a mobile terminal according to the present invention, in which slider-open and slider-closed states are shown in FIG. 2a and FIG. 2b, respectively.
Figure 2:
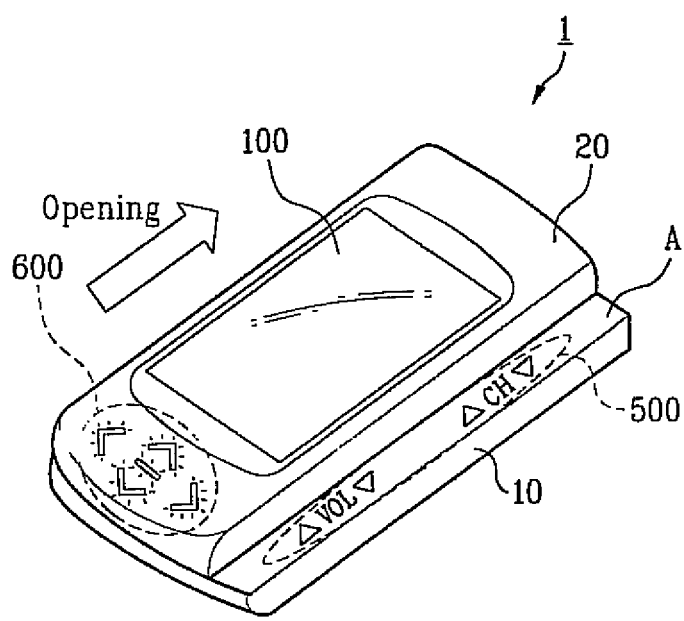

FIG. 1 is a schematic block diagram of a mobile terminal according to the present invention and FIG. 2 is a perspective diagram of a mobile terminal according to the present invention, in which slider-open and slider-closed states are shown in FIG. 2a and FIG. 2b respectively.

The terminal shown In FIG. 1 includes a display unit 100, a memory unit 200, a multimedia playing unit 300, a first input unit 400, a second input unit 500, a third input unit 600, and a control unit 700.

Of course, the mobile terminal according to the present invention can include additional elements such as a radio transceiving unit and a camera unit. The additional elements are not directly associated with the present invention, and explanations of the additional elements will be omitted.

Mobile terminal 1 includes a first body and a second body. If the mobile terminal 1 is a slider-type terminal as shown in FIGS. 2a and 2b, the first body corresponds to a body 10 and the second body corresponds to a slider 20. For convenience of explanation, the following description is that of a slide-type terminal.

The display unit 100 displays information or image necessary to use the terminal. Preferably, the display unit 100 is configured to display the image on the slider 20, and the display unit 100 may include a touchscreen for providing terminal commands.

The memory unit 200 plays stores software, firmware, and data necessary for the operations of the mobile terminal. In particular, multimedia data may be stored in the memory unit 200.

The multimedia playing unit 300 enables various multimedia to be reproduced on the mobile terminal 1. In the present specification "multimedia reproduction" includes the receiving and displaying mobile broadcasting such as DMB, MediaFlo, DVB-H, as well as playing various video and music files. The multimedia playing unit 300 of the present invention can include elements for broadcast reception and reproduction if necessary. Optionally, the multimedia playing unit 300 can be included within the control unit 700.

The slider 20 is assembled to the body 10 to enable one side, and preferably, a front side of the body 10 to be opened or closed by a sliding action of the slider 20. Since the structure for enabling the slider to slide on the body is well known to those skilled in the art, details of the structure are omitted in the following description for the conciseness of the explanation.

The first input unit 400, such as a numeric keypad, is provided to one side of the body 10. The first input unit 400 enables various terminal commands (e.g., commands for making a call, for writing a short message, etc.). If the body 10 is closed by the slider 20, the first input unit 400, as shown in FIG. 2b, is preferably configured to be closed by the slider 20. In viewing one side of the body 10 from the front, the one side is preferably configured to have a rectangular shape having a long axis. Preferably, the slider 20 is configured to slide parallel to the long axis of the body 10.

The body 10, as shown FIG. 2b, is preferably configured to expose a portion, A, of the one side even if the first input unit 400 on the body 10 is closed by the slider 20. The exposed portion A is preferably located along an edge of one of two long sides of the rectangle when the slide 20 slides parallel to the long axis of body 10. In this case, a shape enabling a terminal user to feel a rectangle is enough to be called the rectangular shape of the present invention but does not need to meet the definition of 'rectangle' in dictionary. To emphasize this, an expression 'substantial rectangle' is used in the following description if necessary.

Figure 3:
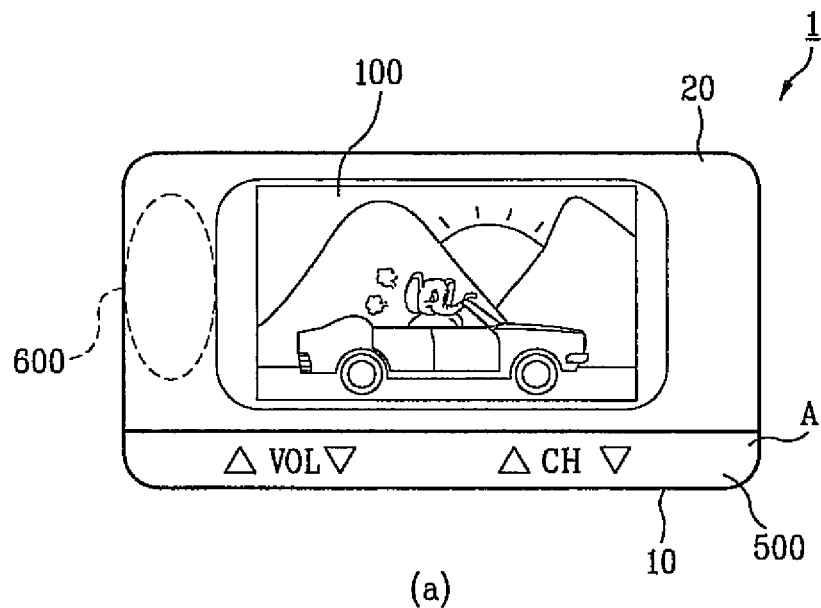
FIG. 3a and FIG. 3b show the front view of the mobile terminal of FIG. 2b.
Figure 3:
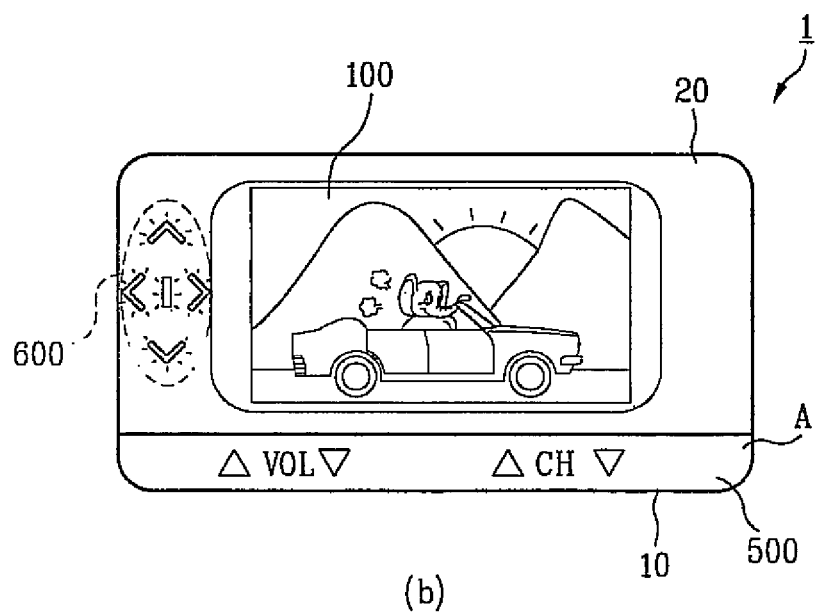

Referring now to FIGS. 3a and 3b, a front diagram of the slider-closed mobile terminal of FIG. 2b is shown. The third input unit 600 may emit light as shown in FIG. 3b. The display unit 100 is preferably arranged on a central part of a front side of the slider 20 to simulate the viewing aspect of a conventional television when the slider 20 is closed. The second input unit 500 is arranged horizontally on the first body 10 similar to a small television to control the multimedia reproduction.

Arranging the screen of the display unit 100 in the central part of the front side of the slider 20 does not always indicate that a center of the screen precisely and geometrically coincides with a center of the slider. To emphasize this, an expression of "substantially arranged in a central part" shall be used in the following description.

A third input unit 600 corresponding for example to navigation functions can be provided on the slider 20. While multimedia contents are being reproduced, the third input unit 600 is not visible. Details of this configuration of the slider 20 are explained as follows.

The third input unit 600 preferably includes a luminescent touch pad and is preferably configured to be exposed and visible; the control unit 700 controls the third input unit 600 such that it is not illuminated while the multimedia contents are being reproduced. If an exterior color of the third input unit 600 when it is not illuminated is selected to be the same as that of the slider 20, the third input unit 600, as shown in FIG. 3a, appears invisible. Therefore, third input unit 600 does not distract from viewing the reproduced multimedia.

The control unit 700 controls the illumination of the third input unit 600 as shown in FIG. 3b, for example when receiving a short message, thereby prompting the user to enter an appropriate command.

Figure 4:
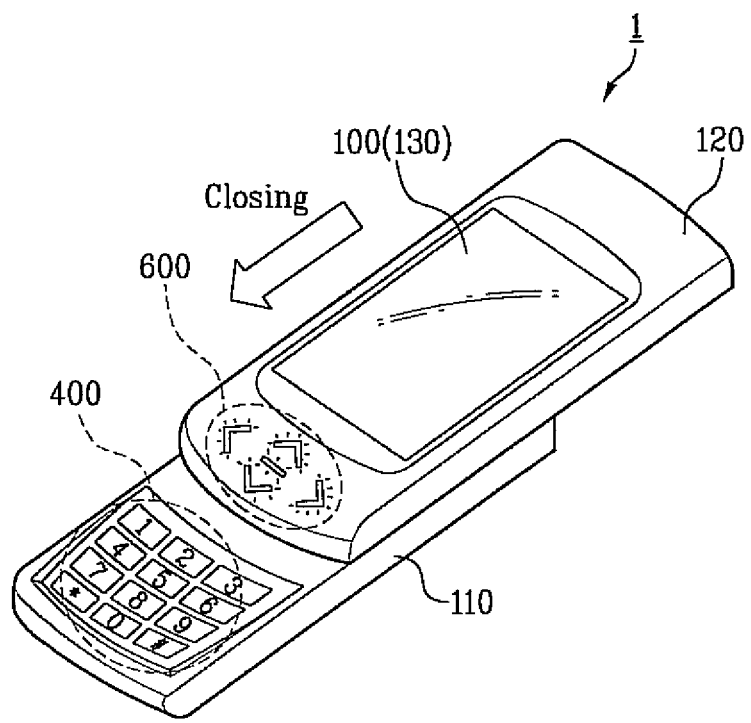
FIGS. 4a and 4b show one modification of the mobile terminal of FIG. 2.
Figure 4:
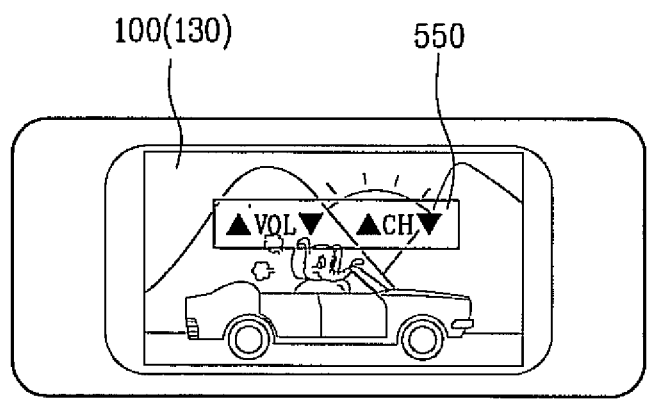

A modified example of the above-explained mobile terminal according to the present invention is explained with reference to FIGS. 4a and 4b as follows. FIGS. 4a and 4b show a modification of the mobile terminal shown in FIGS. 2a and 2b. FIG. 4a is a perspective view of a slider-open mobile terminal according to the modified example, and FIG. 4b is a front view of the terminal when the slider is closed.

In the modified example, the display unit 100 includes a touchscreen 130 to replace at least one of the input units 400, 500, and 600. Referring to FIG. 4b, a plurality of input keys 550 necessary for control of the multimedia reproduction are provided on the touchscreen 130. In this case, it is unnecessary to provide an exposed portion of the body 110 to arrange the second input unit 500 separately. The slider 120 can be configured to cover the whole of the first body 110.

The control unit 700 controls the respective elements of the mobile terminal 1. In particular, in case that the third input unit 600 is provided on the front side of the slider 20, the control unit 700 controls luminescence of the third input unit 600. If so, the third input unit 600 is not visible when multimedia is being reproduced and is not a distraction to viewing the reproduced multimedia.

Accordingly, the present invention provides the following effects or advantages.

First of all, multimedia reproduction is easily and conveniently controlled using a second input unit while a slider is closed.

Secondly, if an input unit is provided on a slider, the input unit can be invisible to a terminal user while multimedia is reproduced. The presence of the input unit does not interfere with the viewing of the multimedia reproduction.

Thirdly, since a screen of a display unit is placed in a central part of a front side of a slider, it is horizontally arranged while the slider is closed thereby simulating the appearance of a small television.

It will be apparent to those skilled in the art that various modifications and variations can be made in the present invention without departing from the spirit or scope of the inventions. For example, the exposed portion A mentioned above may be located along an edge of one of two short sides of the rectangle when the slide 20 slides parallel or perpendicular to the long axis of body 10. Thus, it is intended that the present invention covers the modifications and variations of this invention provided they come within the scope of the appended claims and their equivalents.

What is claimed is:

1. A mobile terminal comprising:
   a first body comprising a first input unit and a second input unit, wherein the first and second input units are located on a first face of the first body;
   a second body connected to the first body and comprising a display unit;
   a slider connecting the first body and the second body and configured to close or open the mobile terminal by a sliding motion such that the first input unit is concealed when the mobile terminal is closed via the slider and the second input unit is always visible whether the mobile terminal is open or closed via the slider; and
   a control unit configured to control terminal operations and multimedia reproduction, wherein the second body further comprises a third input unit that is located on a second face of the second body on which a display screen of the display unit is located, wherein the third input unit comprises a luminescent device that is separate from the display unit on the second face of the second body, wherein the second face of the second body, on which the third input unit and the display screen are located, is always visible whether the mobile terminal is open or closed via the slider, and wherein the luminescent device is not illuminated during the multimedia reproduction while the multimedia is displayed on the display unit.

2. The mobile terminal of claim 1, wherein the display unit comprises a touchscreen.

3. The mobile terminal of claim 1, wherein the second input unit is located at an edge area of the first face of the first body.

4. The mobile terminal of claim 3, wherein the edge area is located along one of two long sides of the first body.

5. The mobile terminal of claim 1, wherein the slider slides in a longitudinal direction of the first body.

6. The mobile terminal of claim 1, wherein the display screen of the display unit is located on a substantially central portion of a front side of the second body.

7. The mobile terminal of claim 1, wherein the multimedia reproduction comprises mobile broadcasting.

8. The terminal of claim 1, wherein the first input unit comprises at least a numeric keypad and the luminescent device comprises a luminescent touch pad.

9. The mobile terminal of claim 1, wherein the control unit is further configured to control the luminescent device to illuminate the third input unit in response to an event.

10. The mobile terminal of claim 1, wherein an exterior color of the third input unit appears same as an exterior color of the second body when the luminescent device is not illuminated.

11. The mobile terminal of claim 1, wherein the first input unit is concealed while the second input unit is visible when the mobile terminal is closed via the slider.

12. The mobile terminal of claim 1, wherein the slider is in contact with at least the first face of the first body or a third face of the second body that is located on an opposite side of the second face.

13. The mobile terminal of claim 1, wherein the second body is positioned on top of the first face of the first body such that at least a portion of the first face is always concealed by the second body whether the mobile terminal is open or closed via the slider.

14. A mobile terminal comprising:
a main body having a numeric keypad and at least one input unit configured for controlling multimedia reproduction, wherein the numeric keypad and the at least one input unit are located on a same face of the main body;
a slider connected to the main body such that the numeric keypad of the main body is exposed when the mobile terminal is opened via a sliding motion;
a second body connected to the main body via the slider, the second body having a display unit; and
a control unit configured for controlling terminal operations and the multimedia reproduction, wherein when the mobile terminal is completely closed via the slider, the numeric keypad is concealed and a portion on the same face of the main body is exposed revealing the at least one input unit dedicated for controlling the multimedia reproduction, wherein the second body further comprises an input unit that is located on a same face of the second body as a display screen of the display unit, wherein the input unit of the second body comprises a luminescent device that is separate from the display unit on the same face of the second body, wherein the same face of the second body, on which the input unit and the display screen are located, is always visible whether the mobile terminal is open or closed via the slider, and wherein the luminescent device is not illuminated during the multimedia reproduction while the multimedia is displayed on the display unit.

15. The terminal of claim 14, wherein the same face of the main body has a substantially rectangular shape and the exposed portion of the same face is located along one of two long edges of the same face of the main body.

16. The terminal of claim 14, wherein the display unit comprises a touchscreen that is located on a substantially central part of a front face of the second body.

17. The terminal of claim 14, wherein the main body has a rectangular shape having a long axis and the slider slides in a direction parallel to the long axis of the main body.

18. The terminal of claim 14, wherein the multimedia reproduction comprises displaying a mobile broadcast.

19. A mobile terminal comprising:
a main body having a first input unit and a second input unit; and
a slider slidably connected to the main body and having a touchscreen, wherein the main body comprises a first portion that is covered by the slider when the slider is completely closed with respect to the main body and a second portion that extends from the first portion in a vertical direction with respect to a sliding direction of the slider such that the second portion is not covered by the slider even when the slider is completely closed with respect to the main body, wherein the first input unit is located on the first portion and the second input unit is located on the second portion, the second input unit comprising a plurality of input keys arranged along the sliding direction, wherein the slider further comprises a third input unit that is located on a same face of the slider as the touchscreen, wherein the third input unit comprises a luminescent device that is separate from the touchscreen on the same face of the slider, wherein the same face of the slider, on which the third input unit and the touchscreen are located, is always visible whether the slider is open or closed with respect to the main body, and wherein the luminescent device is not illuminated when multimedia is reproduced and displayed on the touchscreen.

* * * * *